United States Patent
Stiens

[11] Patent Number: 6,031,951
[45] Date of Patent: Feb. 29, 2000

[54] TRANSMISSION-MODE OPTICAL COUPLING MECHANISM AND METHOD OF MANUFACTURING THE SAME

[75] Inventor: Johan Stiens, Brussels, Belgium

[73] Assignee: Rose Research, L.L.C., Dallas, Tex.

[21] Appl. No.: 09/065,476

[22] Filed: Apr. 24, 1998

[51] Int. Cl.[7] .................................................. G02B 6/34
[52] U.S. Cl. .......................................... 385/37; 359/576
[58] Field of Search ....................... 385/10, 37; 359/568, 359/576

[56] References Cited

U.S. PATENT DOCUMENTS

| | | | |
|---|---|---|---|
| 4,492,739 | 1/1985 | Cline | 428/611 |
| 5,311,605 | 5/1994 | Stewart | 385/10 |
| 5,734,772 | 3/1998 | Gopalan et al. | 385/37 |

OTHER PUBLICATIONS

"Grating Coupled Infrared Modular at Normal Incidence Based on Intersubband Transitions" by J. Y. Duboz, V. Berger, N. Laurent, D. Adam and J. Nagle; Mar. 1997; pp. 1569–1571.

"Optical Coupling Mechanisms in Quantum Well Infrared Photodetectors" by Sumith Bandara, Sarath Gunapala, John Liu, Winn Hong and Jin Park; 1997; pp. 103–108.

"9–$\mu$m Cutoff 256×256 GaAs/Al$_x$—$_x$As Quantum Well Infrared Photodetector Hand–Held Camera" by Sarath D. Gunapala, John K. Liu, Jin S. Park, Mani Sundaram, Craig A Schott, Ted Hoelter, True–Lon Lin, S. T. Massie, Paul D. Maker, Richard E. Muller and Gabby Sarusi; Jan. 1997; pp. 51–57.

"15–$\mu$m 128×128 GaAs/Al$_x$Gal–$_x$ As Quantum Well Infrared Photodetector Focal Plane Array Camera" by Sarath D. Gunapala, Jin S. Park, Gabby Sarusi, True–Lon Lin, John K. Liu, Paul D. Maker, Richard E. Muller, Craig A. Schott and Ted Hoelter; Jan. 1997; pp. 45–50.

"High–Speed InGaAs Metal–Semiconductor–Metal Photodetectors with Thin Absorption Layers" by W.A. Wohlmuth, P. Fay, K. Vaccaro, E.A. Martin, and I. Adesida; 1997; pp. 654–656.

*Primary Examiner*—Hung N. Ngo

[57] ABSTRACT

For use over a substrate having a substrate refractive index, a diffraction grating for, and method of, converting normally incident light into horizontally propagating light inside the substrate and an optical device employing the diffraction grating or method. In one embodiment, the diffraction grating includes: (1) a first volume of a first material having a first refractive index higher than said substrate refractive index, and (2) a second volume of a second material having a second refractive index lower than the substrate refractive index, the second volume being less than the first volume.

26 Claims, 7 Drawing Sheets

TRANSMISSION-MODE OPTICAL COUPLING MECHANISM AND METHOD OF MANUFACTURING THE SAME

TECHNICAL FIELD OF THE INVENTION

The present invention is directed, in general, to an optical processing apparatus and, more specifically, to a highly efficient optical coupling mechanism that operates in transmission mode and a method of manufacturing the optical coupling mechanism.

BACKGROUND OF THE INVENTION

A variety of opto-electronic devices and systems can be made more efficient by causing light to propagate horizontally inside a substrate containing light-sensitive layers ("horizontally" being relative and meaning that the light has a lengthwise propagation component with respect to the substrate). In many applications, incident light is available from a source normal to the substrate. Light-coupling mechanisms therefore are required substantially to change a propagation direction of the incident light as it enters the substrate. In general, coupling efficiency of the light-coupling mechanism decreases as a change in the propagation direction increases. In addition, the use of substrates with high refractive indices also lowers coupling efficiency.

Many devices, such as photodetectors and other sensors, would benefit from an efficient conversion of normally incident light into horizontally propagating light within the substrate. Normally, as used herein, is relative and means that the light has a propagation component normal to a surface of the substrate. In photodetectors, for example, an interaction length of normally incident photons within an absorbing or sensing layer of the substrate can be drastically increased when the photons propagate obliquely inside the substrate. The resulting increase in an absorption coefficient allows the absorbing layer to be made thinner. Miniaturization of the detector area, coupled with thinner absorbing layers, thus allows for the fabrication of high speed photodetectors.

Some types of photodetectors, such as infrared photodetectors, rely on intersubband transitions in quantum wells. The intersubband transitions, however, can only be induced by a photon electric field directed along a growth direction of the substrate. Since the growth direction is vertical, normally incident light (having an electric field perpendicular to its direction of propagation) produces no interaction between the photon electric field and the quantum wells. The normally incident light therefore must be converted into horizontally propagating light in the substrate to induce the intersubband transitions.

Modulators that exploit the characteristics of bulk polariton effects are another class of devices that would benefit from the horizontal propagation of light inside the substrate. A modulation depth of the modulators increases as the angle of propagation in the substrate approaches horizontal. Additionally, modulation applications require that a beam of light entering a modulation area leaves the modulation area as a beam. Beam characteristics, such as propagation direction therefore must be conserved. Conservation of beam characteristics, however, limits the type of light-coupling mechanisms that may be used with the modulators.

Other devices, such as very sensitive sensors, exploit surface wave characteristics of light. These devices require not only that the light propagate almost horizontally inside the substrate, but also that the propagation direction of the light be conserved.

A number of different light-coupling techniques have been proposed. One technique attempts to couple as much light as possible into the substrate by positioning the substrate under a Brewster angle. While transverse magnetic (TM) polarized light enters the substrate with an efficiency of almost 100%, refraction of the light towards the normal reduces the efficiency of this technique, making it undesirable for detection and sensing applications. Another technique involves polishing the substrate to an angle of less than 45° to convert incident light to an almost horizontally propagating beam. The incident light may thus penetrate the substrate at the proper angle. An efficiency of the polishing technique, however, is low. While the efficiency may be increased by the use of anti-reflective coatings, the polishing technique is difficult to integrate into large arrays.

Diffraction gratings have also been proposed. Diffraction gratings operating in transmission mode are used to diffract light into many orders. While diffraction gratings exhibit a high total efficiency, diffraction efficiencies related to horizontal propagation are low. Single order diffraction gratings, produced from the same material as the substrate and operating in transmission mode, have also been proposed. The gratings, however, are inherently limited in efficiency due to a mismatch between grating modes and substrate modes. The efficiency of the gratings may be increased by covering the gratings with a layer of reflective metal. The reflective layer, however, restrict the grating, allowing it to operate only in reflection mode.

Accordingly, what is needed in the art is a coupling mechanism that operates in transmission mode to more efficiently convert normally incident light into horizontally propagating light while conserving the beam characteristics of the light.

SUMMARY OF THE INVENTION

To address the above-discussed deficiencies of the prior art, the present invention provides, for use over a substrate having a substrate refractive index, a diffraction grating for, and method of, converting normally incident light into horizontally propagating light inside the substrate and an opto-electronic device employing the diffraction grating or method. In one embodiment, the diffraction grating includes: (1) a first volume of a first material having a first refractive index higher than the substrate refractive index, and (2) a second volume of a second material having a second refractive index lower than the substrate refractive index, the second volume being less than the first volume.

The present invention therefore introduces the broad concept of using a diffraction grating that operates in transmission mode to convert normally incident light into horizontally propagating light or convert horizontally propagating light into vertically propagating light more efficiently, while conserving the beam characteristics of the light.

In one embodiment of the present invention, the grating has a duty cycle exceeding 60%. In a preferred embodiment, the grating has a duty cycle exceeding 70%. Duty cycle, as used herein, refers to a ratio of the first volume to a sum of the first and second volumes.

In one embodiment, the first and second materials are arranged in alternating parallel lines over the substrate. In another embodiment, the first material is arranged in a matrix of orthogonally cross-hatched lines.

In one embodiment, the substrate forms a portion of an optical fiber. Of course, the use of the substrate to form a portion of another device (such as a photodetector or a modulator) is well within the broad scope of the present invention.

In a preferred embodiment of the present invention, the first material is selected from the group consisting of Germanium (Ge), and Lead Tellurium (PbTe). Those skilled in the art will understand that other elements or compounds may also be used for the first and second materials.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
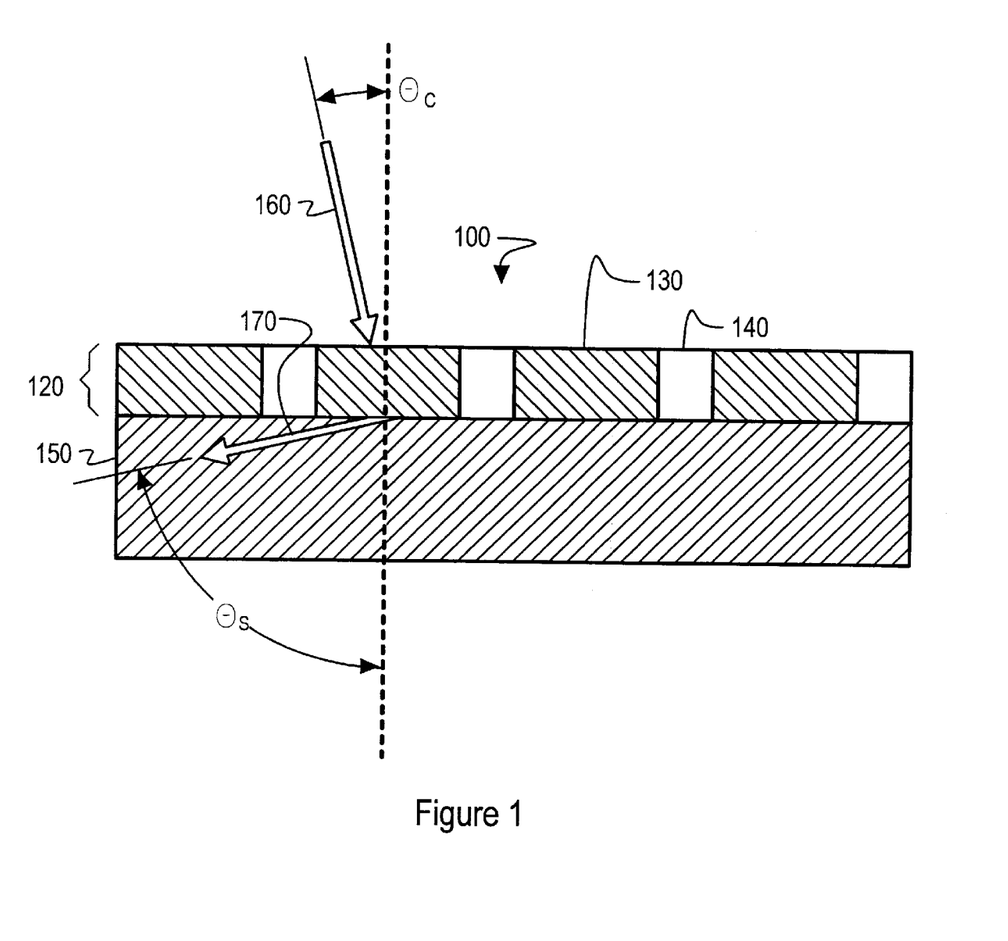
FIG. 1 illustrates a cross-sectional view of a portion of an opto-electronic device constructed according to the principles of the present invention.

Referring initially to FIG. 1, illustrated is a cross-sectional view of a portion of an opto-electronic device 100 constructed according to the principles of the present invention. The device 100 comprises a one-dimensional diffraction grating 120, coupled to a substrate 150 having a substrate refractive index $n_S$. Normally incident light 160 enters the device 100 from a cover material (not shown) having a cover refractive index $n_C$. In the illustrated embodiment, the cover material is air. Of course the use of other materials for the cover material is well within the broad scope of the present invention. The diffraction grating 120, operating in transmission mode, converts the normally incident light 160 into horizontally propagating light 170 inside the substrate 150.

In the illustrated embodiment, the diffraction grating 120 is located over the substrate 150 and includes a volume of a first material (one of which is designated 130) having a first refractive index $n_{g,H}$ higher than the substrate refractive index $n_S$. The diffraction grating 120 further includes a volume of a second material (one of which is designated 140) having a second refractive index $n_{g,L}$ lower than the substrate refractive index $n_S$. The first and second materials 130, 140 are arranged in alternating parallel lines in an asymmetric manner wherein the second volume of the second material 140 is less than the first volume of the first material 130. The first material thus occupies a greater proportion of the diffraction grating 120 than the second material 140. In one embodiment of the present invention, the first and second materials 130, 140 are quasi-transparent for a given wavelength spectrum. In a preferred embodiment, the first material 130 is Germanium (Ge) and the substrate 150 is a Group III–V semiconductor substrate, for use with transverse magnetic (TM) polarized incident light having wavelengths between 1.8 and 14 micron. In another preferred embodiment, the first material is Lead Tellurium (PbTe), for use with transverse electric (TE) polarized light having wavelengths between 3.5 and 20 micron. Of course, the use of other materials or other wavelengths of light is well within the broad scope of the present invention.

Incident light 160 is available in one of two polarization states, transverse electric or transverse magnetic. For each polarization state, a set of parameters exists that will maximize transmission of the incident light 160. The relationship between an angle of propagation of the incident light 160 in the cover material and an angle of propagation of the light inside the substrate 150 may be described by the following equation:

$$\frac{2\pi n_c}{\lambda}\sin(\theta_c) - \frac{2\pi m}{\Lambda} = \frac{2\pi n_s}{\lambda}\sin(\theta_s)$$

where $n_C$ represents a cover refractive index of the cover material, $\theta_C$ represents an angle of propagation of the incident light 160 in the cover material, $n_S$ represents the substrate refractive index, $\theta_S$ represents an angle of propagation of the horizontally propagating light 170 in the substrate 150, $\lambda$ represents a wavelength of the incident light in vacuum, $\Lambda$ represents a grating period, and m represents a diffraction order. To maximize a first order diffraction, m is set equal to one, and the grating period $\Lambda$ is selected such that only one transmission order can be excited inside the substrate 150. The diffraction grating features a high optical conversion efficiency between light propagating vertically in the cover ($\theta_c \approx 0$) and horizontally in the substrate ($\theta_s \approx 90$).

The diffraction grating 120 may be fabricated by conventional methods. Those skilled in the art will realize that the first and second materials 130, 140 need not be of electronic quality. In fact, dislocations and shear stresses present at an interface between the diffraction grating 120 and the substrate 150 may not affect an operation of the diffraction grating 120 so long as absorption is not induced. The first and second grating materials 130, 140, however, should be of good optical quality, thereby yielding minimal absorption losses.

The diffraction grating 120 may therefore be used to form a portion of an optical fiber. Of course, the use of the substrate to form a portion of another device (such as a photodetector or a modulator) is well within the broad scope of the present invention.

Figure 2A:
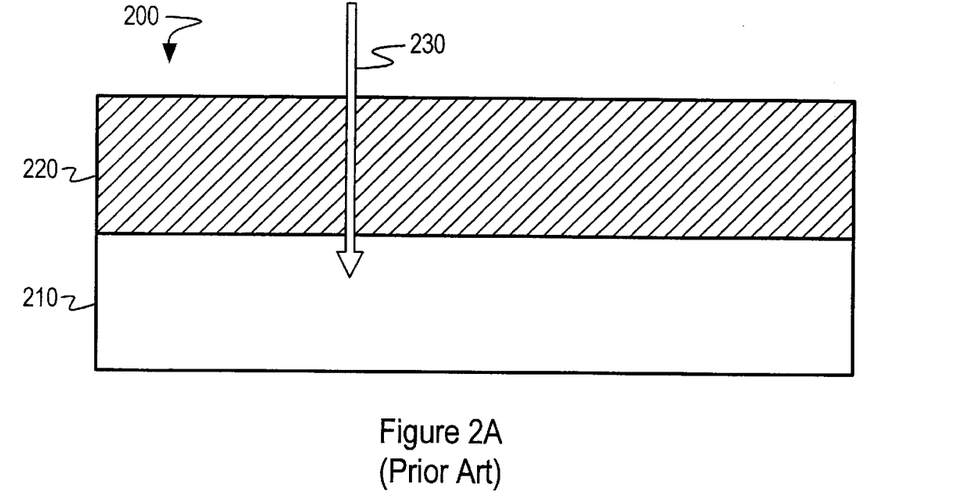
FIG. 2A illustrates a cross-sectional view of a portion of a prior art opto-electronic device.
Figure 2B:
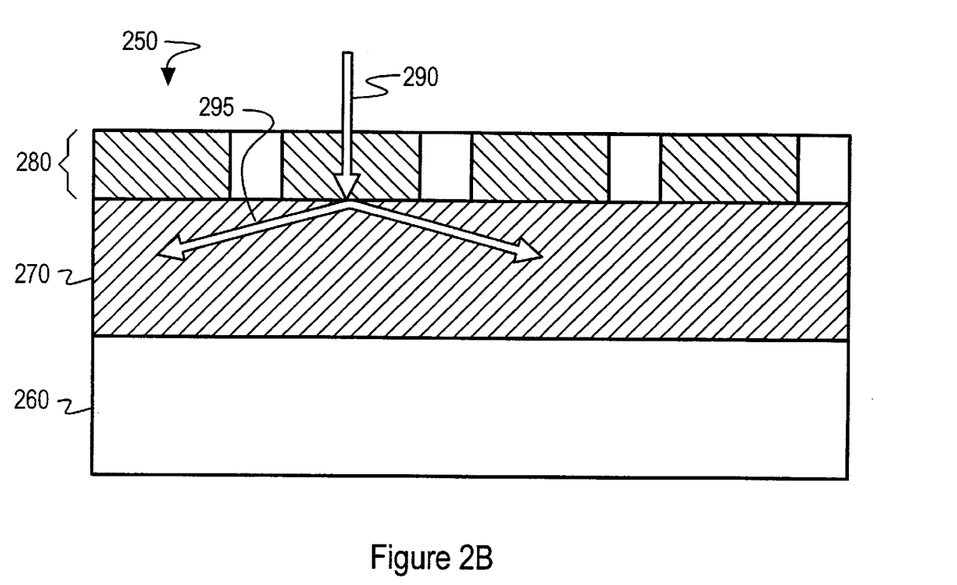
FIG. 2B illustrates a cross-sectional view of a portion of an opto-electronic device constructed according to the principles of the present invention.

Turning now to FIGS. 2A and 2B, illustrated are cross sectional views of first and second opto-electronic devices 200, 250, shown side by side for comparison. More specifically, FIG. 2A illustrates a cross-sectional view of a portion of a prior art opto-electronic device 200. FIG. 2B illustrates a cross-sectional view of a portion of an opto-electronic device 250 constructed according to the principles of the present invention. The first device 200 comprises of a substrate 210 having an absorbing layer 220. The second device 250 includes a substrate 260 having an absorbing layer 270. The second device 250 further includes a diffraction grating 280, coupled over the substrate 260.

Normally incident light 230 entering the first device 200 continues through the absorbing layer 220 without substantially changing its direction of propagation, interacting with the absorbing layer 220 for a first interaction length L1. Normally incident light 290 entering the second device 250 is converted by the diffraction grating 280 into horizontally propagating light 295. A second interaction length L2 of the horizontally propagating light 295 with the absorbing layer 270 is therefore greater than the first interaction length L1. The absorbing layer 270 of the second device 250 may thus absorb more light or, alternatively, may be made thinner to absorb the same amount of light as the absorbing layer 220 of the first device 200.

Figure 3:
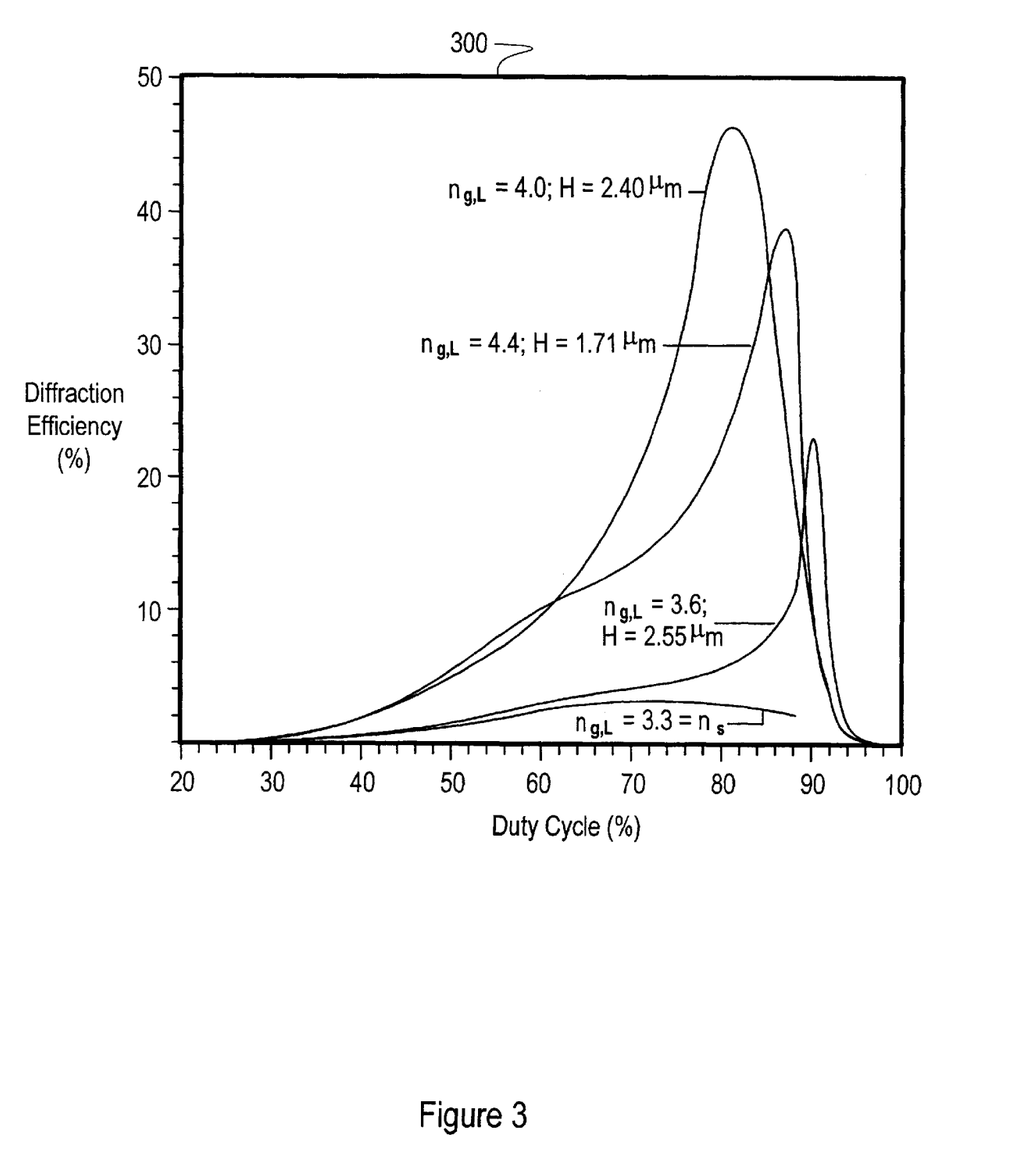
FIG. 3 illustrates an exemplary graph of a diffraction efficiency of the diffraction grating of FIG. 1 for TM polarized light.

Turning now to FIG. 3, illustrated is an exemplary graph 300 of a diffraction efficiency of the diffraction grating 120 of FIG. 1 for TM polarized light. The graph 300 illustrates a relationship between the diffraction efficiency and an asymmetric duty cycle of the diffraction grating 120 for various refractive materials.

With continuing reference to FIG. 1, the graph 300 is applicable to a device 100 having a substrate 150 composed of Gallium Arsenide. Further, normally incident light 160 entering the substrate 150 is assumed to have wavelength of 10.6 micron. In the illustrated graph 300, the first refractive index $n_{g,H}$ is varied between 3.3 and 4.4. Additionally, the second refractive index $n_{g,L}$ is assumed to be equal to one for simplicity in calculating the diffraction efficiency and the duty cycle of the first and second materials. As illustrated, optimal diffraction efficiencies may be obtained at highly asymmetric duty cycles (e.g., for a first refractive index $n_{g,H}$ of 4.0, an optimal duty cycle is about 80%). As light is vertical incident the −1 and +1 diffraction order are excited with the same efficiency. The total conversion efficiency from vertical to horizontal propagation is therefore the double of the numbers indicated in FIG. 3. An effective index of the diffraction grating for both polarization states of light may then be represented as:

$$n_{gr} = \sqrt{n_{g,H}^2 \delta + n_{g,L}^2 (1-\delta)}$$

where δ represents the duty cycle of the grating. When this effective grating index $n_{gr}$ is larger than the substrate refractive index $n_s$ and the cover refractive index $n_c$, an equivalent three layer structure appears which exhibits waveguide properties. These waveguiding properties depend on the polarization state of the incident light. The dimensions and the refractive indices of the equivalent waveguide can be selected such that this waveguide starts to leak to the substrate under the angle $\theta_s$, which corresponds to the required horizontal propagation in the substrate. Such a leaky substrate waveguide mode has the following $$\tan\varphi = \frac{-\sqrt{n_{gr}^2 - n_s^2 \sin^2(\theta_s)}}{n_s \cos(\theta_s)} \tan\left[2\pi\sqrt{n_{gr}^2 - n_s^2 \sin^2(\theta_s)}\left(\frac{H}{\lambda}\right) - \tan^{-1}\left(\sqrt{\frac{n_s^2 \sin^2(\theta_s) - n_c^2}{n_{gr}^2 - n_s^2 \sin^2(\theta)}}\right)\right] \begin{array}{l} dis \\ per \\ sio \end{array}$$

n relation for TE polarized light:

$$\tan\varphi = \frac{-\sqrt{n_{gr}^2 - n_s^2 \sin^2(\theta_s)}}{n_s \cos(\theta_s)} \left(\frac{n_s}{n_{gr}}\right)^2 \tan\left[2\pi\sqrt{n_{gr}^2 - n_s^2 \sin^2(\theta_s)}\left(\frac{H}{\lambda}\right) - \tan^{-1}\left(\left(\frac{n_{gr}}{n_c}\right)^2 \sqrt{\frac{n_s^2 \sin^2(\theta_s) - n_c^2}{n_{gr}^2 - n_s^2 \sin^2(\theta_s)}}\right)\right]$$

For TM polarized light, the dispersion relation reads as follows:

When the vertically incident light enters the grating zone, the different diffraction orders are excited obeying the dispersion relation for TE polarized light. When the grating has the correct dimensions and material combinations, one of these diffraction orders exactly matches with the waveguide mode leaking at a maximum rate towards the substrate under the required angle $\theta_s$ due to the matching phase shift φ at the substrate grating zone interface. This equation also shows that the height H of the diffraction grating scales with the wavelength λ of the incident light 160. The diffraction grating 120 therefore may be easily adapted for use with incident light 160 of different wavelengths λ by scaling the height accordingly. As the graph 300 illustrates, increasing the first refractive index $n_{g,H}$ may reduce the duty cycle of the diffraction grating 120. The height H of the diffraction grating 120 may increase, however, requiring deeper etchings. By using the graph 300 and the above equations, an optimal diffraction efficiency may be obtained.

Figure 4:
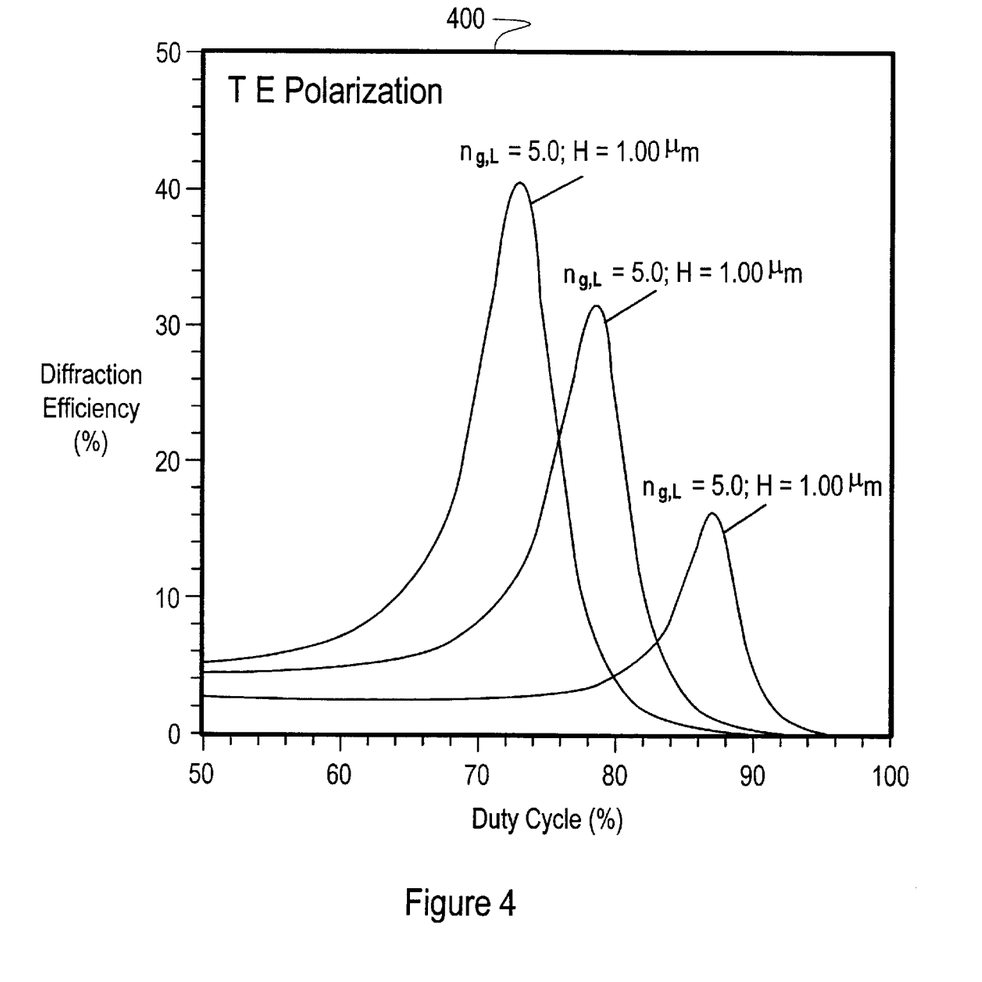
FIG. 4 illustrates an exemplary graph of a diffraction efficiency of the diffraction grating of FIG. 1 for TE polarized light.

Turning now to FIG. 4, illustrated is an exemplary graph 400 of a diffraction efficiency of the diffraction grating 120 of FIG. 1 for TE polarized light. With continuing reference to FIG. 1, the graph 400 illustrates a relationship between the diffraction efficiency and an asymmetric duty cycle of the diffraction grating 120 for various refractive materials. As illustrated, TE polarized light requires a larger first refractive index $n_{g,H}$ to obtain similar diffraction efficiencies.

Figure 5:
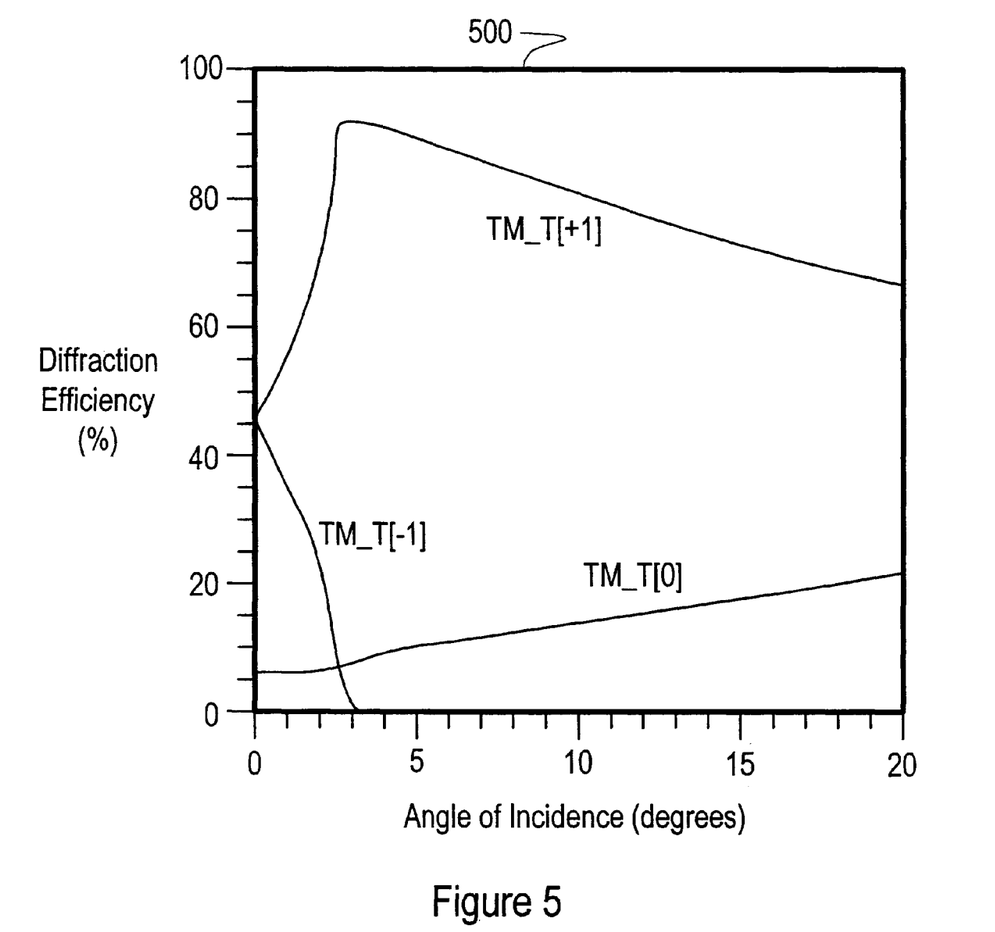
FIG. 5 illustrates another exemplary graph of a diffraction efficiency of the diffraction grating of FIG. 1 for TM polarized incident light.

Turning now to FIG. 5, illustrated is another exemplary graph 500 of a diffraction efficiency of the diffraction grating of FIG. 1 for TM polarized incident light. The graph 500 illustrates a relationship between the diffraction efficiency and an angle of incidence (in degrees) of the incident light. For light at substantially normal angles of incidence (e.g., between 0 and 2.5°), −1 and +1 diffraction orders are excited in substantially equal proportions. A beam of light incident on a substrate therefore may be split into substantially equal components. Detection applications are generally not affected by the splitting of the incident light. For modulation applications, however, it may be preferable to conserve beam characteristics. The angle of incidence therefore should deviate from normal. As the angle of incidence is increased, incident light is diffracted towards the +1 diffraction order and the −1 diffraction order disappears, resulting in one beam propagating inside the substrate.

The graphs 300 and 400 of FIGS. 3 and 4 show that optimal designs for TM and TE polarized light do not coincide. One dimensional diffraction gratings therefore should be designed for either TM or TE polarized light. When incident light is unpolarized, however, the efficiency of the diffraction grating is halved. The present invention therefore introduces a two-dimensional diffraction grating for use with incident light, whether polarized or unpolarized.

Figure 6:
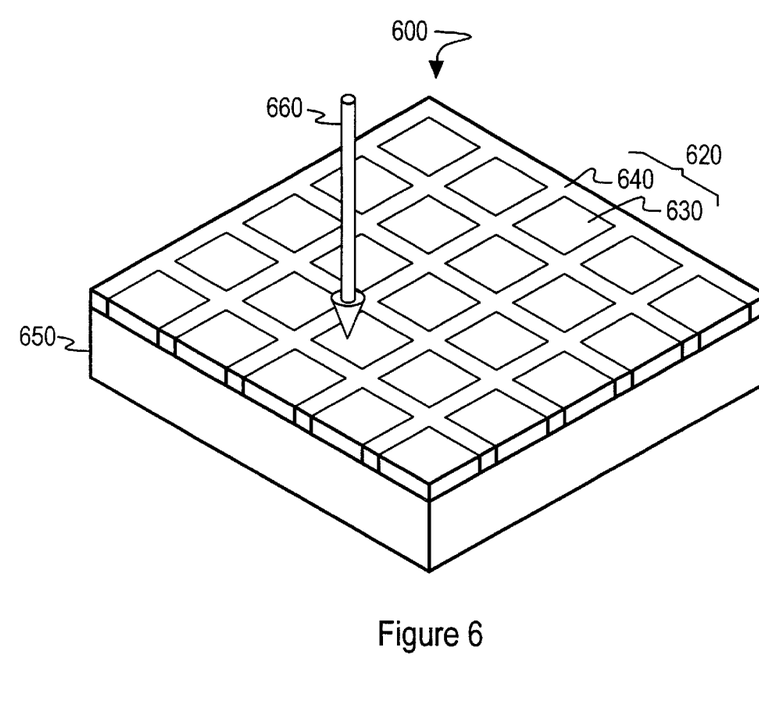
FIG. 6 illustrates a cross-sectional view of a portion of another opto-electronic device constructed according to the principles of the present invention.

Turning now to FIG. 6, illustrated is a cross-sectional view of a portion of another opto-electronic device 600 constructed according to the principles of the present invention. The device 600 comprises a two-dimensional diffraction grating 620, coupled over a substrate 650 having a substrate refractive index $n_S$. Normally incident light 660 enters the device 600 from a cover material (not shown) having a cover refractive index $n_C$. The diffraction grating 620, operating in transmission mode, converts the normally incident light 660 into horizontally propagating light inside the substrate 650.

The diffraction grating 620 includes a first volume of a first material (one of which is designated 630) having a first refractive index $n_{g,H}$ higher than the substrate refractive index $n_S$. The diffraction grating 620 further includes a second volume of a second material (one of which is designated 640) having a second refractive index $n_{g,L}$ lower than the substrate refractive index $n_S$.

In the illustrated embodiment, the second material 640 is arranged in a matrix of orthogonally cross-hatched lines. The first material 630 fills in the areas between the orthogonally cross-hatched lines. The first and second materials 630, 640 are arranged in an asymmetric manner wherein the second volume of the second material 640 is less than the first volume of the first material 630.

Normally incident light 660 entering the device 600, having an electric field perpendicular to the direction of propagation, may be decomposed into TM and TE polarized light. In the illustrated embodiment, TE polarized light oscillates along a first set of grooves of the diffraction grating 620. TM polarized light therefore oscillates perpendicular to the first set of grooves. The diffraction grating 620 is two-dimensional, containing a second set of grooves perpendicular to the first set of grooves. TM polarized light (oscillating perpendicular to the first set of grooves) may therefore be interpreted as TE polarized light, oscillating along the second set of grooves. The TE component diffracts in a first vertical plane, perpendicular to the first set of grooves. The TM component diffracts in a second vertical plane, perpendicular to the first vertical plane. The diffraction grating 620 may be designed such that, for each polarization component, only one diffraction order may be excited and that mixed diffraction orders may be evanescent.

The diffraction grating 620 may be optimized for TM polarized light in a first direction. Since TE polarized light traveling in a second direction, perpendicular to the first direction is interpreted as TM polarized light, the diffraction grating 620 may thus be optimized for TM polarized light in both the first and second directions. Those skilled in the art will understand that the two-dimensional diffraction grating 620 may, alternatively, be optimized for TE polarized light in the first and second directions.

Figure 7:
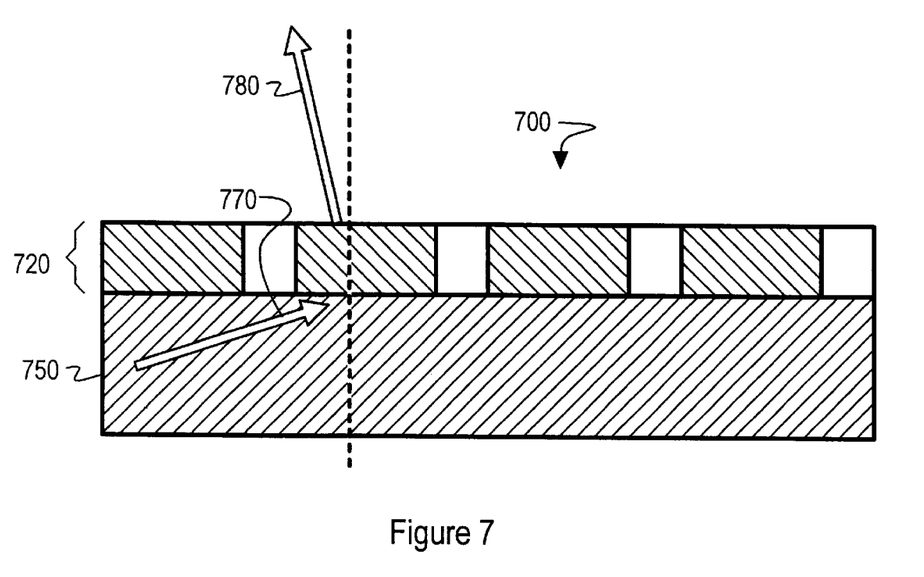
FIG. 7 illustrates a cross-sectional view of a portion of an opto-electronic device constructed according to the principles of the present invention.

Turning now to FIG. 7, illustrated is a cross-sectional view of a portion of an opto-electronic device 700 constructed according to the principles of the present invention. The device 700 comprises a one-dimensional diffraction grating 720, coupled to a substrate 750. The diffraction grating 720 may be used to convert normally incident light into horizontally propagating light inside the substrate 750. Since the diffraction grating 720 is physical in nature, the diffraction grating 720 may also be used to convert horizontally propagating light 770 from inside the substrate 750 to normally propagating light 780 out of the substrate 750 with the same efficiency.

Figure 8:
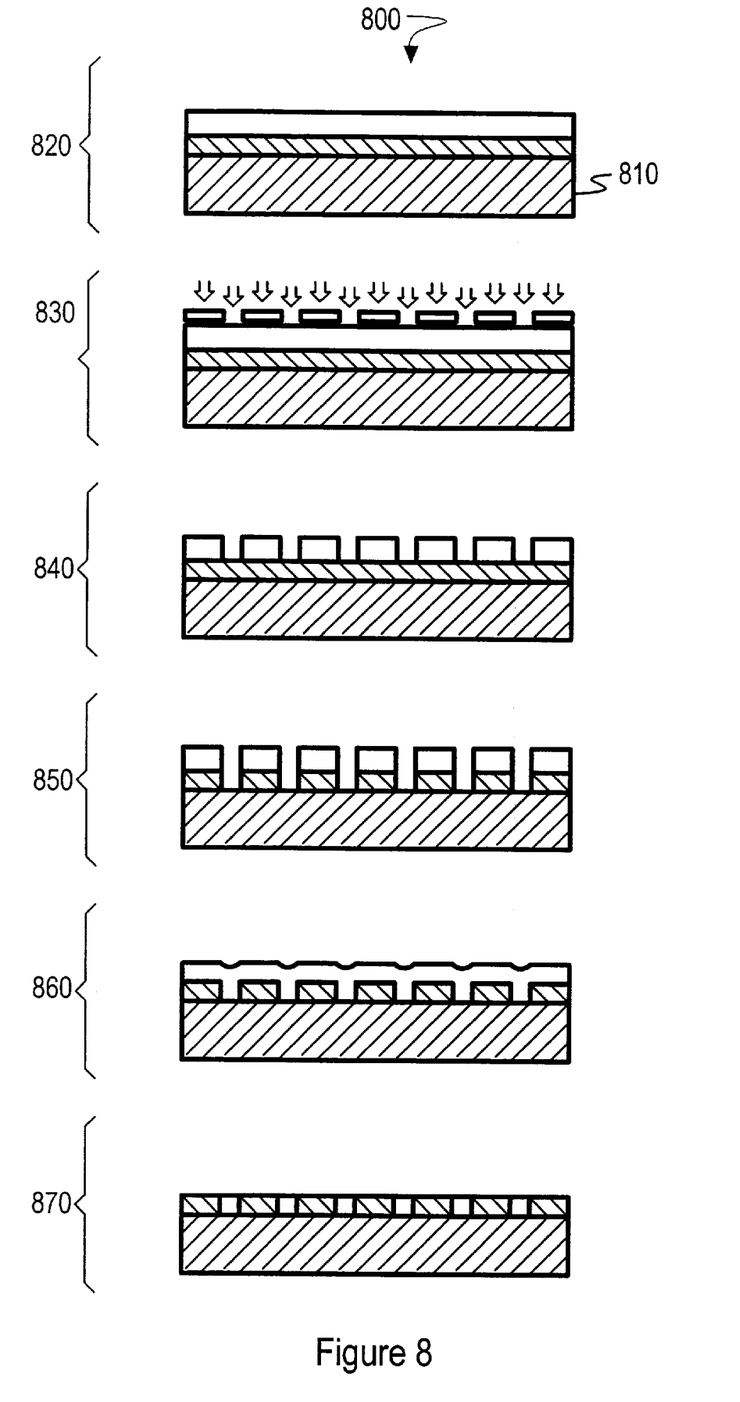
FIG. 8 illustrates a flow diagram of an embodiment of a method for manufacturing a diffraction grating over a substrate in accordance with the principles of the present invention.

Turning now to FIG. 8, illustrated is a flow diagram of an embodiment of a method, generally designated 800, for manufacturing a diffraction grating over a substrate in accordance with the principles of the present invention. In the illustrated embodiment, the clean substrate 810 has a substrate refractive index $n_s$. This substrate can contain different layer structures, which perform the functionality of the device. The functionality of some earlier descried devices can be drastically improved when the novel grating structure is deposited on this substrate. In a first deposition step 820, conventional techniques are used to deposit a uniform layer of thickness H of a first material having a first refractive index $n_{gH}$ higher than the substrate refractive index $n_s$. On top of this first grating material a resist layer is deposited. This resist layer is used to transfer the grating pattern from a mask by means of a lithographic step. This lithographic pattern transfer step 830 can be accomplished by means of photon, electron, ion or X-ray radiation. Once this pattern is transferred to the resist layer as illustrated in step 840 an etching process 850 is performed to etch the pattern into the first grating material. In a first preferred embodiment, the first volume is defined in parallel lines over a portion. In an alternative embodiment, the first volume is defined in parallel lines over a portion. In an alternative embodiment, the first volume is defined in a matrix of orthogonally cross-hatched lines over a portion of the substrate.

Then in a second deposition step 860, conventional techniques are again used to deposit a second volume of a second material having a second refractive index $n_{g,L}$ lower than the substrate refractive index $n_s$. The method ends then in an end step 870 where the second material is chemically-mechanically polished (CMP) to create the final desired grating structure. In a preferred embodiment, the second volume is also defined in parallel lines over a portion of the substrate, the first and second volume forming alternating parallel lines. Alternatively, the second volume is defined into the structures created by the matrix of orthogonally cross-hatched lines of the first volume.

Those skilled in the art should understand that the previously described embodiments of the diffraction grating are submitted for illustrative purposes only and other embodiments, operating in transmission mode, capable of more efficiently converting normally incident light into horizontally propagating light are well within the broad scope of the present invention. For a better understanding of opto-electronic devices, and diffraction gratings see *Optical Coupling Mechanisms in Quantum Well Infrared Detectors,* by S. Bandara, et al., published in SPIE, Vol. 2999 (1997); *9-μm Cutoff 256×256 GaAs/Al$_x$Ga$_{1-x}$As Quantum Well Infrared Photodetector Hand-Held Camera,* by S. D. Gunapala, et al., published in *IEEE Transactions on Electron Devices,* Vol. 44, No. 1 (1997); *15-μm 128×128 GaAs/Al$_x$Ga$_{1-x}$As Quantum Well Infrared Photodetector Focal Plane Array Camera,* by S. D. Gunapala, et al., published in *IEEE Transactions on Electron Devices,* Vol. 44, No. 1 (1997); *Grating Coupled Infrared Modulator at Normal Incidence Based on Intersubband Transitions,* by J. Y. Duboz, et al., published in *Applied Physics Letters,* Vol. 70, No. 12 (1997); and *High-Speed InGaAs Metal-Semiconductor-Metal Photodetectors with Thin Absorption Layers,* by W. A. Wohlmuth, et al., published in *IEEE Photonics Technology Letters,* Vol. 9, No. 5 (1997), incorporated herein by reference.

Although the present invention has been described in detail, those skilled in the art should understand that they can make various changes, substitutions and alterations herein without departing from the spirit and scope of the invention in its broadest form.

What is claimed is:

1. For use over a substrate having a substrate refractive index, a diffraction grating comprising:
   a first volume of a first material having a first refractive index higher than said substrate refractive index; and
   a second volume of a second material having a second refractive index lower than said substrate refractive index, said second volume being less than said first volume.

2. The grating as recited in claim 1 wherein said grating has a duty cycle exceeding 60%.

3. The grating as recited in claim 2 wherein said grating has a duty cycle exceeding 70%.

4. The grating as recited in claim 1 wherein said first and second materials are arranged in alternating parallel lines over said substrate.

5. The grating as recited in claim 1 wherein said second material is arranged in a matrix of orthogonally cross-hatched lines.

6. The grating as recited in claim 1 wherein said substrate forms a portion of an optical fiber.

7. The grating as recited in claim 1 wherein said first material is selected from the group consisting of:
   Germanium (Ge), and
   Lead Tellurium (PbTe).

8. The grating as recited in claim 1 wherein said grating operates in transmission mode to convert normally incident light into horizontally propagating light inside said substrate.

9. The grating as recited in claim 1 wherein said grating operates in transmission mode to convert horizontally propagating light inside said substrate into vertically propagating light outside said substrate.

10. For use over a substrate having a substrate refractive index, a method of manufacturing a diffraction grating over said substrate comprising the steps of:
    depositing a first volume of a first material having a first refractive index higher than said substrate refractive index; and
    depositing a second volume of a second material having a second refractive index lower than said substrate refractive index, said second volume being less than said first volume.

11. The method as recited in claim 10 wherein said grating has a duty cycle exceeding 60%.

12. The method as recited in claim 10 wherein said grating has a duty cycle exceeding 70%.

13. The method as recited in claim 10 wherein said first and second materials are arranged in alternating parallel lines over said substrate.

14. The method as recited in claim 10 wherein said second material is arranged in a matrix of orthogonally cross-hatched lines.

15. The method as recited in claim 10 wherein said substrate forms a portion of an optical fiber.

16. The method as recited in claim 10 wherein said first material is selected from the group consisting of:
    Germanium (Ge), and
    Lead Tellurium (PbTe).

17. The method as recited in claim 10 wherein said grating operates in transmission mode to convert normally incident light into horizontally propagating light inside said substrate.

18. The method as recited in claim 10 wherein said grating operates in transmission mode to convert horizontally propagating light inside said substrate into vertically propagating light outside said substrate.

19. An opto-electronic device, comprising:
    a semiconductor substrate having a substrate refractive index; and
    a diffraction grating including:
       a first volume of a first material having a first refractive index higher than said substrate refractive index; and
       a second volume of a second material having a second refractive index lower than said substrate refractive index, said second volume being less than said first volume.

20. The opto-electronic device as recited in claim 19 wherein said grating has a duty cycle exceeding 60%.

21. The opto-electronic device as recited in claim 19 wherein said first and second materials are arranged in alternating parallel lines over said substrate.

22. The opto-electronic device as recited in claim 19 wherein said second material is arranged in a matrix of orthogonally cross-hatched lines.

23. The opto-electronic device as recited in claim 19 wherein said substrate forms a portion of an optical fiber.

24. The opto-electronic device as recited in claim 19 wherein said first material is selected from the group consisting of:
    Germanium (Ge), and
    Lead Tellurium (PbTe).

25. The opto-electronic device as recited in claim 19 wherein said grating operates in transmission mode to convert normally incident light into horizontally propagating light inside said substrate.

26. The opto-electronic device as recited in claim 19 wherein said grating operates in transmission mode to convert horizontally propagating light inside said substrate into vertically propagating light outside said substrate.

* * * * *